US008224742B2

(12) United States Patent
Gogol et al.

(10) Patent No.: US 8,224,742 B2
(45) Date of Patent: Jul. 17, 2012

(54) PROCESSING BINARY OPTIONS IN FUTURE EXCHANGE CLEARING

(75) Inventors: Edward Gogol, Skokie, IL (US); Dmitriy Glinberg, Northbrook, IL (US); Dale Michaels, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 533 days.

(21) Appl. No.: 12/403,193

(22) Filed: Mar. 12, 2009

(65) Prior Publication Data

US 2009/0177571 A1     Jul. 9, 2009

Related U.S. Application Data

(63) Continuation of application No. 11/465,028, filed on Aug. 16, 2006, now Pat. No. 7,519,554.

(60) Provisional application No. 60/803,472, filed on May 30, 2006.

(51) Int. Cl.
    *G06Q 40/00*     (2012.01)
(52) U.S. Cl. ................ 705/37; 705/1; 705/35; 705/36 R
(58) Field of Classification Search ........................ None
    See application file for complete search history.

(56) References Cited

U.S. PATENT DOCUMENTS

| 7,024,384 | B2 * | 4/2006 | Daughtery, III | ............ | 705/36 R |
| 7,212,997 | B1 * | 5/2007 | Pine et al | ..................... | 705/36 R |
| 2003/0110107 | A1 * | 6/2003 | Hiatt et al. | ....................... | 705/35 |
| 2003/0225657 | A1 | 12/2003 | Whaley et al. | | |
| 2003/0225658 | A1 | 12/2003 | Whaley | | |
| 2005/0075961 | A1 * | 4/2005 | McGill | ........................... | 705/35 |
| 2005/0102214 | A1 * | 5/2005 | Speth et al. | ..................... | 705/36 |
| 2005/0165669 | A1 * | 7/2005 | Montanaro et al. | ............ | 705/37 |
| 2006/0253355 | A1 * | 11/2006 | Shalen | ........................... | 705/35 |

(Continued)

FOREIGN PATENT DOCUMENTS

CA        2454018 A1      6/2004
GB      CA2454018    *   6/2004

OTHER PUBLICATIONS

Wei, Jason, Valuation of Discreet Barrier Options by Interpolations, The Journal of Derivatives, 1998, pp. 51-73.*

(Continued)

*Primary Examiner* — Charles Kyle
*Assistant Examiner* — Robert Niquette
(74) *Attorney, Agent, or Firm* — Banner & Witcoff, Ltd.

(57) ABSTRACT

Systems and methods are disclosed for processing binary options (also referred to as digital options) in existing clearing systems, such as futures clearing systems. The binary option is treated, or processed, similar to standard options on a non-tradeable cash-settled underlying futures contract. A hypothetical instrument, referred to as a book instrument is created to facilitate clearing of the binary option. The book instrument has an expiration date after the expiration of the binary option, such as the day after the expiration of the binary option. For each binary option that expires in the money, a transaction is created for the book instrument future. The underlying book future has an assigned price that is a fixed amount less that the final price for the underlying statistical or actual value of the binary option at expiration. Transactions are loaded in the clearing system and processed and all positions are liquidated. Options exercise and assignment processing is performed in the clearing system as well as an associated clearing firm bookkeeping system.

6 Claims, 2 Drawing Sheets

U.S. PATENT DOCUMENTS

2006/0253359 A1* 11/2006 O'Callahan ............... 705/35
2006/0253367 A1* 11/2006 O'Callahan et al. ........... 705/37
2006/0253368 A1* 11/2006 O'Callahan et al. ........... 705/37
2006/0253369 A1* 11/2006 O'Callahan ............... 705/37
2006/0253370 A1  11/2006 Feuser et al.

OTHER PUBLICATIONS

Wei, Jason, "Valuation of Discreet Barrier Options by Interpolation", The Journal of Derivatives, 1998, pp. 51-73.

* cited by examiner

PROCESSING BINARY OPTIONS IN FUTURE EXCHANGE CLEARING

The present application is a continuation application of U.S. patent application Ser. No. 11/465,028, filed Aug. 16, 2006 and entitled "Processing Binary Options in Future Exchange Clearing," which claims the benefit of U.S. provisional patent application No. 60/803,472, filed May 30, 2006 and entitled "Processing Binary Options in Future Exchange Clearing." Priority is claimed to both applications and the entire disclosures of both applications are hereby incorporated by reference.

FIELD OF THE INVENTION

The present invention relates to clearing positions for expired options, and more particularly, processing binary options as a non-tradeable cash-settled futures contract.

DESCRIPTION OF THE RELATED ART

Clearing processes are performed for derivative products, such as options or vanilla options, after an expiration date for the derivative. Derivative products include options on futures contracts, futures contacts that are functions of other futures contracts, or other financial instruments that have their price related to or derived from an underlying product. A clearing house may process or clear the derivative in a similar manner as for other derivatives, such as in existing futures bookkeeping systems. The clearing house may break a derivative trade into a series of trades that appear to a member firms' bookkeeping systems as if they are standard monthly options on monthly cash-settled non-tradeable futures. That is, a series of trades are not futures and futures-options, but may provide the appearance as such so that they may be easily processed in existing bookkeeping systems.

Binary options, including binary range options, (also referred to as digital options) are cash-settled options that pay a fixed amount if the option ends up in-the-money. The payout amount does not depend on the amount by which the option ends up in-the-money. For a binary call, the option pays if the final value of the statistic or actual value is greater than or equal to a strike price for the option. For a binary put, the option pays if the final value is less than the strike price for the option. A binary range option may have multiple strike prices, such as a lower and an upper strike price. The holder of the binary range option receives (and the seller pays) the fixed payoff amount if the final value of the statistic ends up greater than or equal to the lower strike, and less than the upper strike.

Because of the digital or binary nature of the option, existing clearing systems may not be readily configured to process or clear a binary or binary range option. To directly process these instruments, systems handle (a) the different product characteristics—for example, the binary range options, with fixed payouts and two strike prices, (b) trade quantities which may be expressed as nominal amounts and very large, and (c) strike prices which may be negative. Therefore, the clearing house will break up each trade in an actual auction instrument into a series of trades that appear to be ordinary options trades, in standard monthly options on cash-settled non-tradeable futures, and should flow through firm bookkeeping systems with practically no modifications. Such processing is time-consuming and requires cumbersome decomposition of the option.

Therefore, there exists a need in the art for systems and methods for conveniently clearing and processing binary options.

SUMMARY OF THE INVENTION

Systems and methods are described for processing binary options (also referred to as digital options) in existing clearing systems, such as futures clearing systems. The binary option is treated, or processed, similar to standard options on a non-tradeable cash-settled underlying futures contract. A hypothetical instrument, referred to as a book instrument is created to facilitate clearing of the binary option. The book instrument has an expiration date after the expiration of the binary option, such as the day after the expiration of the binary option. For each binary option that expires in the money, a transaction is created for the book instrument future. The underlying book future has an assigned price that is one less that the final price for the underlying statistical or actual value of the binary option at expiration. Transactions are loaded in the clearing system and processed and all positions are liquidated. Options exercise and assignment processing is performed in the clearing system as well as an associated clearing firm bookkeeping system.

Of course, the methods and systems of the above-referenced embodiments may also include other additional elements, steps, computer-executable instructions, or computer-readable data structures. In this regard, other embodiments are disclosed and claimed herein as well.

In other embodiments, the present invention can be partially or wholly implemented on a computer-readable medium, for example, by storing computer-executable instructions or modules, or by utilizing computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Exemplary Operating Environment

Figure 1:
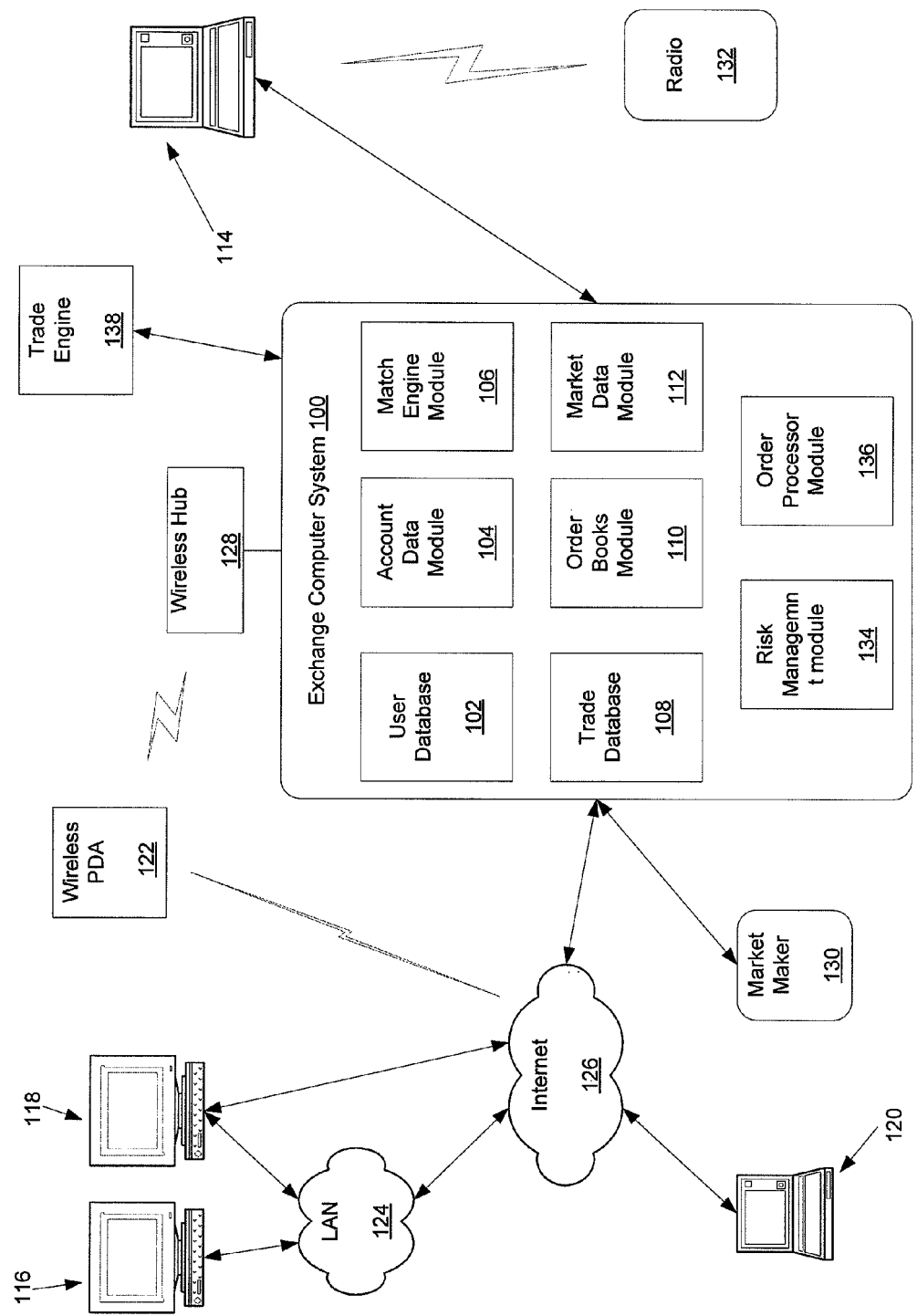
FIG. 1 illustrates a computer network system that may be used to implement aspects of the present invention.

Aspects of the present invention are preferably implemented with computer devices and computer networks that allow users to exchange trading information, such as market data. An exemplary trading network environment for implementing trading systems and methods is shown in FIG. 1.

An exchange computer system 100 receives orders and transmits market data related to orders and trades to users. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds.

An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100.

Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
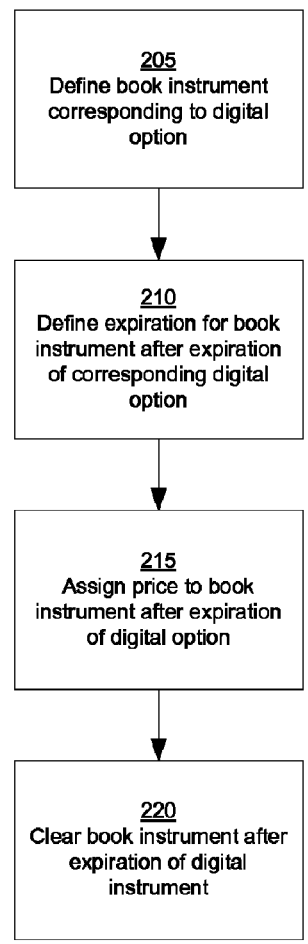
FIG. 2 illustrates a flowchart for an exemplary method for clearing binary options, in accordance with an embodiment of the invention.

FIG. 2 shows a flowchart for an exemplary method for clearing options: define book instrument corresponding to digital option (step 205), define expiration for book instrument after expiration of corresponding digital option (step 210), assign price to book instrument after expiration of digital option (step 215), and clear book instrument after expiration of digital instrument (step 220). In the method, a binary option may be processed without cumbersome decomposition into vanilla options.

In an embodiment, a clearing system is used to process an expired binary option. The binary option is processed as a standard option on a non-tradeable cash-settled underlying future, also referred to as a "book instrument." (i.e. it is only to facilitate processing in clearing firm bookkeeping systems.).

The book instrument is defined to have an expiration date after the expiration of the corresponding binary option. For example, the book instrument may have an expiration date the day after the expiration of the corresponding binary option. In other embodiments, the book instrument and binary option may expire the same day with the binary option expiring before the book instrument The non-tradeable underlying future's maturity date may also be set to expire the business date after the real option expiration date.

On or before the real expiration date, trading ceases for the binary option. Option expiration processing for the binary option is not run on the normal expiration date for the binary option, since the date is defined in the clearing system according to the book instrument as the next business day.

On the expiration of the book instrument, such as the day after or intra day after the expiration of the binary option, exactly liquidating transfer transactions are created, loaded into the clearing system, and transmitted to clearing firms for loading into their bookkeeping systems, for each expired binary option position. For example, if a position in an expiring option was 35 long by 17 short, then a sell trade for 35, and a buy trade for 17 are created. These transfer transactions are defined as liquidating, either trade by trade (if that is how the clearing system operates for these products), or implicitly by specifying an ending position ("position change specification", or PCS) of zero by zero.

For each binary option position which has expired in-the-money, transactions are created for the underlying "book" instrument future, at a price with a value fixed amount, such as one, less than the final price for the underlying statistic of the binary option:

i) For long call and short put positions, the book-instrument futures transaction is created as a buy transaction; and ii) For short call and long put positions, the book-instrument futures transaction is created as a sell transaction.

The liquidating transfer transactions for all the expired binary option positions, and the "book-instrument" futures transactions for those which finished in-the-money, are loaded into the clearing system. This in turn causes messages to be transmitted to clearing firms to allow the transactions to be loaded into clearing firm bookkeeping systems.

As clearing processing continues, no other transactions in these options are allowed to clear on that day; no special option instructions (exercise notices or option abandonments) are accepted, nor any position adjustments or other transaction which could affect the ending option position. The net effect, together with the liquidating transfer transactions that have been posted to the expired option positions, is that all such positions are liquidated.

Option exercise and assignment processing is run normally in both the clearing system and in clearing firm bookkeeping systems for the binary option positions, as if they were vanilla options, since the expiration date in the clearing system has been set to a later date or time, such as the next business day. However, since all of these option positions have been liquidated, there are no positions to exercise or assign, even for the ones which finished in-the-money. Hence the fact that exercise and assignment processing is run as if for vanilla options, creating transactions at the strike price, has no effect.

At the first clearing settlement cycle of that day, the special futures transactions for the in-the-money options, created at a fixed price, such as one, less than the final value of the option's underlying statistic, are marked-to-market to that final value. This process, which occurs in both the clearing system and in clearing firm bookkeeping systems, causes the binary payout cash flows to occur.

Money calculations for the book instruments—When calculating premium for trades in futures options in a bookkeeping system, the trade price is multiplied by the contract value factor (the multiplier that converts the quoted price to its monetary value) and the trade quantity. In other words, for futures options, calculate the premium for a quantity of one, then round, then multiply by the trade quantity.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

The invention claimed is:

1. A method of processing a binary option based on an underlying instrument and having an expiration date, the method comprising:
  (a) creating a book instrument in a clearing computer system based on the binary option and having a book instrument expiration date after the binary option expiration date;
  (b) after the binary option expiration date, conducting a liquidating transfer transaction for the binary option in the clearing computer system;
  (c) after the binary option expiration date and prior to the book instrument expiration date, determining in the clearing computer system whether the binary option expired in the money; and
  (d) based on the binary option expiring in the money, and prior to the book instrument expiration date, loading into the clearing computer system a transaction for the book instrument at a fixed price different from a final value of the underlying instrument.

2. The method of claim 1, wherein the binary option comprises a binary option contract.

3. The method of claim 1, wherein the underlying instrument comprises a futures contract.

4. The method of claim 1, wherein the book instrument comprises a non-tradeable cash-settled underlying contract.

5. The method of claim 1, wherein the fixed price in (d) is one U.S. dollar.

6. The method of claim 1, wherein (d) comprises generating a cash flow corresponding to a payout of the binary option.

* * * * *